United States Patent [19]

Wu et al.

[11] Patent Number: 4,749,414
[45] Date of Patent: Jun. 7, 1988

[54] COMPOSITION FOR MODIFYING POLYMERIC SURFACES AND ARTICLES PRODUCED THEREBY

[75] Inventors: Marinda L. Wu, San Ramon; John F. Voeks, Lafayette, both of Calif.

[73] Assignee: The Dow Chemical Company, Midland, Mich.

[21] Appl. No.: 942,410

[22] Filed: Dec. 16, 1986

Related U.S. Application Data

[62] Division of Ser. No. 715,707, Mar. 25, 1985, Pat. No. 4,664,978.

[51] Int. Cl.$^4$ .................. C08L 1/32; C09J 3/04; C09K 3/30
[52] U.S. Cl. .................. 106/183; 106/179; 106/190; 106/191; 252/305; 536/66
[58] Field of Search ............ 252/305; 106/179, 183, 106/190, 191; 536/66

[56] References Cited

U.S. PATENT DOCUMENTS

| | | | |
|---|---|---|---|
| 1,838,078 | 12/1931 | Dreyfus | 106/190 |
| 2,888,367 | 5/1959 | Greyson | 428/422 |
| 2,974,061 | 3/1961 | Duerr | 427/415 X |
| 2,980,491 | 4/1961 | Segal et al. | 8/120 |
| 2,992,881 | 7/1961 | Berni et al. | 8/120 |
| 3,055,852 | 9/1962 | Youse | 428/422 X |
| 3,154,506 | 10/1964 | Janssens | 428/422 X |
| 3,206,344 | 9/1965 | Elkins, Jr. | 156/86 |
| 3,356,551 | 12/1967 | Glenn et al. | 156/49 |
| 3,361,679 | 1/1968 | Paulus | 252/305 |
| 3,567,521 | 3/1971 | Toy et al. | 148/6.3 |
| 3,764,370 | 10/1973 | Bragole | 427/302 X |
| 3,940,384 | 2/1976 | Teng et al. | 106/183 X |
| 3,946,136 | 3/1976 | Fitz et al. | 428/422 |
| 4,136,218 | 1/1979 | Nischwitz et al. | 427/415 X |
| 4,144,374 | 3/1979 | Lagow et al. | 427/302 X |
| 4,252,859 | 2/1981 | Concannon et al. | 428/422 |
| 4,316,772 | 2/1982 | Cheng et al. | 202/163 |
| 4,419,187 | 12/1983 | Cheng et al. | 202/200 |
| 4,469,836 | 9/1984 | Schmidt | 524/376 |
| 4,486,277 | 12/1984 | Miyake et al. | 204/98 |
| 4,487,926 | 12/1984 | Ishikawa et al. | 536/82 |

FOREIGN PATENT DOCUMENTS 2558809  7/1976  Fed. Rep. of Germany ........ 536/66
58-92449  6/1983  Japan.

*Primary Examiner*—Richard D. Lovering

[57] ABSTRACT

The invention relates to a composition useful for producing a modifying adherent layer on a passive polymeric material, said composition comprising (A) a fluorinated ester substituted alkoxy cellulose having, on the average, between about 1.0 to 2.99 of the three reactive hydroxyl groups of each glucose unit present as alkoxy groups, and the remainder of the reactive hydroxyl groups of each glucose unit present as a fluoroester group of the formula:

(i) 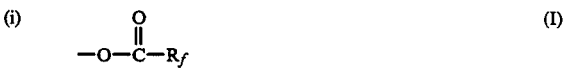 (I)

wherein $R_f$ is branched perfluoroalkyl comprising 3 to 20 carbon atoms; or $-(CF_2)_nCF_2-Q$, wherein Q is hydrogen of fluorine; n is an integer from 1 to 19; or (ii) 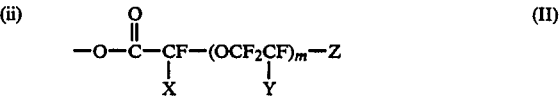 (II)

wherein X is selected from the group consisting of —F, —CF$_3$ and —CF$_2$Cl, Y is —F, —Cl, —CF$_2$Cl or perfluoroalkyl having from 1 to 10 carbon atoms, Z is —F, —Cl, —CF$_3$ or CF$_2$Cl, and m is an integer from 1 to 12; and (B) an organic solvent. The composition may be in an enclosed container having integral fluid delivery means such as a gas-pressurized container or a container having a manual pump.

21 Claims, No Drawings

COMPOSITION FOR MODIFYING POLYMERIC SURFACES AND ARTICLES PRODUCED THEREBY

This is a division of Ser. No. 715,707, filed Mar. 25, 1985 now U.S. Pat. No. 4,664,978.

BACKGROUND OF THE INVENTION

1. Field of the Invention

This invention relates to a method of producing a modifying layer or coating surface on a passive polymeric material. More particularly, this invention relates to the production of a modifying adhering layer on a passive fluorinated or a nonfluorinated polymer surface using a fluorinated alkanoyl ester modified alkoxycellulose. The modifying cellulosic layer produced has adhesive properties to bond fluorinated surfaces to other materials. The modified cellulose layer also produces a controlled hydrophilicity on the surface of a passive polymeric material, which is useful for the printing of inks, etc. on the modified surface, and for better control of water infusion in a porous membrane. The article produced having a layer of the fluorinated ester substituted alkoxy cellulose is also considered to be part of this invention. A container and the unreacted fluorinated ester substituted alkoxy cellulose composition in a form for application of the composition to the passive polymeric material is also described.

There are many types of passive polymeric materials which have surfaces not generally wettable by water, oils, paints, inks, and the like. A polymer substrate is sufficiently hydrophobic so that it is not soluble in water and usually possesses a contact angle with water of between about 65 and 130°, preferably between about 65 and 110°. The surface of some passive polymeric materials may be swellable or soluble in the presence of certain solvent-based inks or paints. As used herein, the term "passive polymer" or "passive polymeric material" includes poly(halocarbons), poly(halohydrocarbons), poly(alkylenes), poly(carbonates) and the like. Important commercial passive polymers include the polyhalocarbon resins, for example, polytetrafluoroethylene (TEFLON ® PTFE, a DuPont Co. trademark), a copolymer of tetrafluoroethylene with tetrafluoropropylene (TEFLON ® FEP, a DuPont Co. trademark), and polytrifluoromonochloroethylene (Kel-F ® a 3M Co. trademark, or Flurothene ®, a DuPont Co. trademark); poly(halohydrocarbons, such as poly(vinyl fluoride) (TEDLAR ®, a DuPont Co. trademark), polyvinylchloride and the like. Other polymers having generally difficultly wettable (or passive) surfaces also include the poly(alkylenes), such as polyethylene (all types) and polypropylene (all types), polycarbonates and the like. The process of the present invention is generally applicable to such passive or difficultly wettable polymers, but offers special advantages with the poly(halocarbons).

Related Disclosures

The modification of polymeric and other surfaces to achieve particular physical and chemical properties has been the object of considerable research over the past 25 years. Some disclosures in this area are as follows.

In U.S. Pat. No. 3,055,852, Youse describes a process for modifying the surface of various substrates. Youse uses a three-component system, including a polytetrafluoroethylene, a cellulose ether resin and a dispersive medium which will dissolve the resin and disperse the tetrafluoroethylene. The dispersion is applied to a surface at ambient temperature to form a protective dry film lubricant coating of cellulose-polytetrafluoroethylene. At no point in Youse's procedure is a chemically modified fluorinated cellulose produced.

In a similar disclosure, in U.S. Pat. No. 3,154,506, Janssens describes a combination of a polytetrafluoroethylene-water insoluble cellulose ester dispersion, and a method of forming a coating with the dispersion. The dispersion contains polytetrafluoroethylene, a water-insoluble cellulose resin in a dispersing medium. Again, there is no chemical reaction between the fluorinated ethylene and the cellulose present.

In U.S. Pat. No. 2,992,881, Berni et al. disclose a process for the production of perfluoroalkanoyl esters of cellulose. This patent describes the treatment of the free hydroxyl groups of a cellulosic material with a fluorinated acid halide to impart durable oil-and water-repellent properties to the cellulose, usually a cellulose fiber or fabric. They do not disclose the further treatment of a polymeric material with their fluorine-modified fiber, as is found in the present invention.

In a similar disclosure, Segal et al. in U.S. Pat. No. 2,980,491 disclose the modification of a cellulose fiber using a fluorinated acid anhydride. The goal of Segal et al. is to modify the cellulose fibers so that they are more resistant to wetting with water.

Glenn et al. disclose in U.S. Pat. No. 3,356,551 a method of adhesively joining articles made of polytetrafluoroethylene. Their process requires: (1) the wrapping of fluorinated ethylene/propylene material around the pieces of polytetrafluoroethylene, (2) wrapping with polytetrafluoroethylene, (3) a metallic foil, and (4) heat shrinking and sealing the pieces together.

In U.S. Pat. No. 3,206,344, Elkins discloses a process for bonding a film of copolymer of hexafluoropropylene and tetrafluoropropylene to a metal. This process requires a laminated tape comprising a polyacrylonitrile, TEFLON and the copolymer of hexafluoropropylene and tetrafluoroethylene.

In U.S. Pat. No. 2,888,367, Greyson discloses a process for promoting adhesion to a difficultly wettable polymer surface. Greyson describes oxidizing the surface of a fluorinated material, such as TEFLON, using a tetraalkyl- or tetraalkoxy-titanate polymerized in situ using water, and the surface is further modified by incorporation by perfluoroalkanoic acids or fluorinated alcohols. Some titanium dioxide may also be present. The polymerization occurs on the oxidized surface of the passive article to be modified.

In U.S. Pat. No. 3,567,521, Toy et al. describe a process for coating a metal with a thin fluorinated polymer. The metal surface is first treated with elemental fluorine to form a chemically bonded surface coating of metal fluoride. The metal fluoride surface is subsequently exposed to a film-forming monomer, such as tetrafluoroethylene. The in situ polymerization produces a uniform continuous adherent polymer coating of poly(tetrafluoroethylene).

In U.S. Pat. No. 3,946,136, Fitz et al. describe how shaped structures of polytetrafluoroethylene are connected with themselves or another material and are stable up to 400° C. They describe the use of an interlayer consisting of 90 to 95% by weight of polytetrafluoroethylene and 0.5 to 10% by weight of a perfluoroalkyl-perfluorovinyl ether, between the surfaces to be connected and compressing the composite under pressure at temperatures of 320° to 400° C.

In U.S. Pat. No. 4,487,926, Ishikawa et al. disclose fluorine-containing acyl substituted cellulose derivatives which are useful for the materials of fibers, moldings, films, semipermeable membranes, coatings or the like. The acyl groups include acetyl, propionyl or butyryl. However, the present invention described herein uses alkoxy substituted cellulose derivatives which are further reacted with fluorine containing esters to produce adherent layers.

In U.S. Pat. No. 4,486,277, Miyake et al. disclose an electrolytic cation exchange membrane which comprises a first film made of a fluorinated polymer having cation exchange groups and a second film laminated thereon, made up of a fluorinated polymer having carboxylic acid groups as ion exchange groups. The composition of both layers of this membrane is considerably different from those described in the present invention.

T. Concannon et al. in U.S. Pat. No. 4,252,859 disclose blends of polytetrafluoroethylene and fluorinated ether copolymers of polytetrafluoroethylene which can be used as nonstick coatings in cookware. They describe the coating composition and coated articles thereof limited to the above description. No fluorinated cellulosic material is described.

Japanese Kokai Pat. No. 83-92449 (published June 1, 1983, assigned to Asahi Chemical Industry, K.K. of Osaka, Japan) discloses the preparation of selective membranes for the separation of oxygen from mixtures of oxygen and nitrogen. The membranes comprise:

$$[\text{ALKOXY CELLULOSE}]-\underset{\underset{O}{\|}}{C}-\underset{\underset{C_aF_{2a+1}}{|}}{CF}-(OCF_2-\underset{\underset{C_aF_{2a+1}}{|}}{CF})_b-Y$$

where Y is —F, —Cl, —Br, or —I; a is 0 or 1; and b is 1 through 10. Cellulose derivatives of the polyether esters in the form of porous membranes are described. These fluorinated ester alkoxy modified cellulose membranes are prepared for use in the separation of gaseous oxygen and nitrogen by selective permeability. This reference describes some of the compositions of the present invention, but does not disclose the use of these modified cellulose polymers as adherent coatings, layers, adhesives, or as hydrophilicity modifying coatings or layers.

All of these art methods are not without some disadvantages. The oxidizing of the surfaces of a passive polymer may not proceed in a controlled manner. Fluorine gas is toxic and dangerous to use under all conditions. Adhesive procedures for passive polymers which require high temperatures and/or pressures are expensive and inconvenient.

Therefore, it is highly desirable to provide an improved coating or layer, which adheres to a passive polymeric material and also provides a controlled hydrophilic surface for a passive polymer. A simple process for producing this adherent layer on a passive polymeric material at mild conditions is also disclosed.

SUMMARY OF THE INVENTION

In one aspect, the present invention relates to a process for producing a modifying adherent layer on a passive polymeric material, the layer comprising a fluorinated ester substituted alkoxy cellulose having, on the average, between about 1.0 to 2.99 of the three reactive hydroxyl groups of each glucose unit present as alkoxy groups, and the remainder of between about 0.01 to 2.00 of the reactive hydroxyl groups of each glucose unit are present as a fluoroester group of the formula:

(i) 
$$-O-\overset{O}{\underset{\|}{C}}-R_f \qquad (I)$$

wherein:

$R_f$ is branched perfluoroalkyl comprising 3 to 20 carbon atoms, or $-(CF_2)_nCF_2-Q$, wherein Q is hydrogen or fluorine, and n is an integer between 1 and 19; or (ii)
$$-O-\overset{O}{\underset{\|}{C}}-\underset{\underset{X}{|}}{CF}-(OCF_2\underset{\underset{Y}{|}}{CF})_m-Z \qquad (II)$$

wherein:

X is selected from the group consisting of —F, —CF$_3$ and —CF$_2$Cl,

Y is —F, —Cl, —CF$_2$Cl or perfluoroalkyl having from 1 to 10 carbon atoms,

Z is —F, —Cl, —CF$_3$ or —CF$_2$Cl, and m is an integer from 1 to 12;

in which the process includes:

(a) applying to the polymeric material the substituted cellulose in an organic solvent; and (b) thereafter removing the solvent.

In another aspect, the present invention relates to an article having a modifying polymeric layer or surface comprising the aforementioned fluorinated ester substituted alkoxy cellulose.

In another aspect, the present invention relates to a process to produce a layer and to an article having an adherent layer on a passive polymeric material where the layer has controlled hydrophilicity, whereby the contact angle of water on this adherent layer is between 85° and 95°.

In another aspect, the present invention is useful in forming adherent layers on improved composite porous membranes to facilitate the separation of liquids, particularly in the separation of fresh water from salt water.

In yet another aspect, the present invention relates to the product of the process - an article additionally having on the modified fluorinated ester alkoxy cellulose layer one or more adherent paints, varnishes, dyes, metals, fluorinated metal surfaces, alloys of metal and the like.

In still another aspect, the present invention relates to a device for containing and delivering the fluorinated ester alkoxy cellulose composition and a suitable volatile organic solvent.

DETAILED DESCRIPTION OF THE INVENTION

The present invention concerns methods of modifying the surface of a passive polymeric material with an adherent fluorinated ester modified alkoxy cellulose, so that the surface of the passive polymer has a controlled hydrophilicity, and will also allow other materials to adhere to the normally passive polymer surface.

Process for Preparation of Adherent Cellulose Layers

Suitable materials for the practice of the present invention are either commercially available or are prepared by adaptation of procedures described in the literature.

The modifying coatings of the present invention are generally represented by cellulose having the glucose repeating unit, of the formula:

where $R_f$ is branched perfluoroalkyl comprising 3 to 20 carbon atoms, or is $-(CF_2)_nCF_2Q$ wherein Q is hydrogen or fluorine, and n is an integer between 1 and 19 (preferably between 1 and 12); or

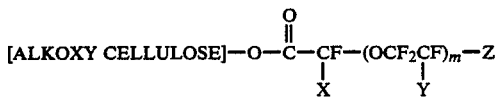

where X is selected from the group consisting of $-F$, $-CF_3$ and $-CF_2Cl$; Y is $-F$, $-Cl$, $-CF_2Cl$ or perfluoroalkyl having from 1 to 10 carbon atoms, Z is from the group consisting of $-F$, $-Cl$, $-CF_3$ and $-CF_2Cl$; and m is an integer from 1 to 12. The layers may contain mixtures of two or more such materials as well.

The layers of this invention may be depicted in another manner, i.e.:

CELLULOSE

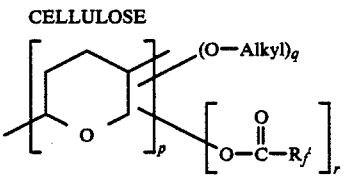

where the cellulose is a polymer of β-D-glucose units linked together with the elimination of water to form chains, comprising between about 2000–4000 units. Therefore, "p" is a number between about 2000 and 4000;

alkyl is as defined herein;

q is between about 1.0 and 2.99;

$R_f'$ is the fluorinated alkyl or fluorinated ether ester group found herein as formula I and II, respectively;

r is between about 0.01 and 2.00; and q+r are essentially equal to 3. However, it is contemplated within this invention that some residual hydroxyl groups are present. Thus, q+r may be less than 3.

A discussion of the process and the components used follows below.

Cellulose Having Alkoxy and Fluorinated Aryl Side Groups

The alkoxy cellulose, which is modified by having fluorine-containing acyl groups on the reactive hydroxyl groups, is prepared in the following manner. Alkoxy-cellulose (as described hereinbelow) is dissolved in an excess of a dry solvent, such as methylene dichloride, ethylene dichloride, or the like at ambient temperature. To the solution is added slowly with stirring the fluorinated acyl halide or a polyfluoroether acyl halide, in at least a 10% molar excess to react with the reactive free hydroxyl groups of the cellulose. If a hydroxy alkoxy-cellulose, such as hydroxybutyl-METHOCEL ®, is used, sufficient fluorinated acyl halide is used for essentially complete esterification of the hydroxyl portion of the alkoxy group. During the addition of the halide, an equivalent of an amine, such as pyridine or triethylamine, is added to absorb the hydrogen halide produced. The reaction mixture is stirred at ambient temperature for about 2 to 10 hr, preferably about 4 to 6 hr. The solution is poured into an alcohol:-water (usually ethanol:water, 50:50 to 70:30) and the polymer precipitates. The liquid is removed by decanting, filtration, etc. and the solid product is redissolved in acetone and precipitates by adding alcohol:water (e.g., methanol:water, 50:50 to 70:30) filtered and dried. Equivalent synthetic and isolation procedures may be used. (See Preparation B below).

CELLULOSE MATERIALS

Substantially any cellulosic material containing free hydroxyl groups is suitably employed in the present invention. Illustrative examples include fibers and partial esters of cellulose, partial ethers such as ethoxylated and methoxylated of cellulose and the like. Particularly useful are the lower alkoxy ethers (having 1–4 carbon atoms) of cellulose, such as Co., New York, New York (1969) and references cited therein]. Commercially available fluorinated acyl fluorides and acyl chlorides are available from PCR, Inc., Gainesville, Florida or Aldrich Chemical Company, Milwaukee, Wisconsin. Branched fluoroalkyl are included in the present invention for formula I. Thus appropriate starting materials include perfluoroisobutyryl chloride, perfluoro-2,2-dimethylpropionyl chloride, perfluoroisooctanoyl chloride, perfluoroeicosanoyl chloride and the like. Preferably, the branched fluorinated derivatives have in the $R_f$ group between about 3 and 20 carbon atoms, more preferably between about 3 and 15 carbon atoms and especially between about 3 and 12 carbon atoms. Suitable linear acid fluorides and chlorides include perfluoroacetyl fluoride, perfluoropropionyl fluoride, perfluoropropionyl chloride, perfluorobutyryl fluoride and chloride, perfluorooctanoyl chloride, perfluoroeicosanoyl chloride, 3H-2,2,3,3-tetrafluoropropionyl chloride, 4H-2,2,3,3,4,4-hexafluorobutyryl chloride, 13H-perfluorotridecanoyl chloride and the like. Preferred acyl halides are those where Q is $-F$. Additionally preferred halides are those where n is from 2 to 10, and particularly where n is from 1 to 12, especially from 2 to 6.

Fluorinated Polyether Acyl Halides

The fluorinated polyether acyl fluorides are generally formed according to the following reaction. A fluorinated acyl fluoride is reacted with a fluorinated epoxide in the presence of cesium fluoride: methyl cellulose and ethyl cellulose, preferably having from between about 1.0 to 2.99 available free hydroxyl groups, more preferably from between about 2 and 2.99 free hydroxyl groups. These materials, having free hydroxyl groups on the backbone of the polymer, are available from a variety of commercial sources, primarily from the Dow Chemical Company, Midland, Michigan 48640, as standard and medium METHOCEL ® and ETHOCEL ®. A preferred substituted cellulose has between about 2.20 and 2.60 of the reactive hydroxyl groups present as alkoxy groups. The recited number of hydroxyl groups substituted by alkyl and/or fluoride-containing groups are average values.

Standard ETHOCEL (49.7% ethoxy substituted) has each glucose unit of the cellulose containing about 2.58 ethoxy groups and about 0.42 of the residual groups are reactive hydroxyl groups. Medium ETHOCEL (46.3% ethoxy) has each glucose unit containing roughly 2.23 ethoxy groups and about 0.77 of the residual groups are reactive hydroxyl groups. METHOCEL is also available as the hydroxypropyl-METHOCEL and hydroxybutyl-METHOCEL. This invention contemplates the use of these hydroxyalkoxy cellulose materials. Therefore, the term "alkoxy" includes hydroxypropoxy, hydroxybutoxy and the like.

Fluorinated Acyl Halides

The linear and branched fluorinated acyl halides which react with the reactive hydroxyls of the alkoxy cellulose are either commercially available or may be prepared by adaptation of procedures described in the literature. [See W. A. Sheppard and C. M. Sharts, *Organic Fluorine Chemistry*, W. A. Benjamin &

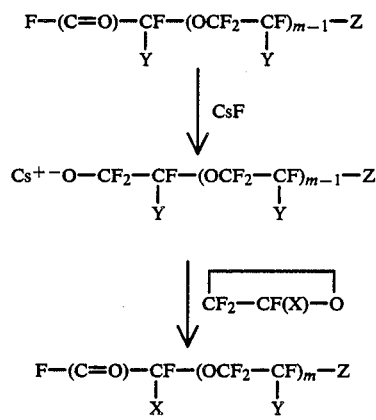

where X, Y, Z and m are defined hereinabove. The fluorinated acyl halides are either commercially available or prepared by adaptation of reported laboratory procedures. (See Sheppard and Sharts above and U.S. Pat. Nos. 3,250,806; 3,250,807; and 3,250,808, which are incorporated herein by reference.) The fluorinated epoxide is selected from perfluoroethylene oxide, perfluoropropylene oxide, chlorodifluoromethylperfluoroethylene oxide or the like. In this method of synthesis the reaction with the epoxide often results in a mixture of telomers of the formula:

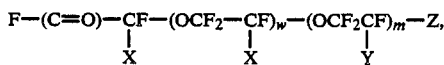

where X, Y, Z and m are as defined hereinabove, and w is from 0 to 6. Usually the telomer mixture is separated by fractional distillation. However, the mixture of telomers having an acyl fluoride reactive group may be used to react with the reactive hydroxyl groups of the cellulose in this invention. Preferred halides are those where m is an integer from 2 to 8, and more preferred are from 2 to 6. The preparation of fluorinated polyether acyl fluorides is described below in more detail in Preparation A.

Liquids (Solvent)

The liquids [or solvent(s)] used to dissolve and eventually deliver the fluorinated ester substituted alkoxy cellulose polymers described herein are those organic liquids normally used as solvents in laboratory or commercial applications. The number of carbon atoms present in the organic liquid is usually 12 or less. Preferably, the organic liquid has a boiling point at atmospheric pressure of less than 205° C. More, preferably the liquid has a boiling point of between about 30° and 200° C., particularly between about 30° and 150° C., especially between 30° and 115° C. The solvents include linear, branched or cyclic hydrocarbons, (saturated and unsaturated), aromatic hydrocarbons, halocarbons, halohydrocarbons, FREON ®s, esters, ketones, ethers, alcohols, nitriles and the like. More particularly, solvents include, for example, hexane, acetone, methyl ethyl ketone, benzene, toluene, ethyl acetate, propyl acetate, diethyl ether, tetrahydrofuran, dioxane, methylene chloride, chloroform, ethylene dichloride, acetonitrile, dimethylformamide and the like. In some applications, benzyl alcohol which has a high boiling point is used. Mixtures of one or more of these liquids are also useful as solvents, such as ethyl acetate:ethylene dichloride (1:1 by volume) and toluene:ethylene dichloride:ethyl acetate (1:1:1 by volume) and (2:1:1 by volume).

Formation of Adherent Layers

The following procedure is used to form the adherent layer. The alkoxy cellulose polymer further modified by fluorinated acyl groups (as described above) is dissolved in an organic solvent (or mixtures thereof) at about ambient temperature to produce about a 5 to 25% by weight polymer solution. About a 10 to 12% by weight solution is preferred. The polymer may be filtered to remove any particulate or insoluble gel. The polymer solution is then applied to a passive polymer surface typically using a casting bar or a doctor blade, or equivalent application methods, e.g., dipping, spraying, brushing or the like can be used, if desired, and the solvent is then removed by methods known in the art, e.g. washing, freeze drying, evaporation, and the like. Temperatures over 100° C. may be used, provided that the passive polymer will withstand these conditions. Typical temperatures are from freeze-drying conditions, approximately −40° C., to 100° C., with temperatures from about ambient to 100° C. being preferred. Reduced pressure may also be used, in combination with heat, to speed the evaporation of the solvent, typically from about 1 mm Hg (absolute) to atmospheric. A thin adherent layer of the fluorinated ester substituted alkoxy cellulose polymer, of the order of between about 1 to 25 mil in thickness, is produced on the surface of the passive polymer. A layer thickness of about 10-15 mil is generally preferred. In placing a thin hydrophilic film or layer on a porous membrane, spraying or sputtering may also be used to obtain very thin film in the $\mu$ meter range or less in thickness. More than one application may be necessary to achieve the desired thickness or properties.

In some cases adhering the thin layer to a TEFLON article, a second polymer, such as polyethylene or a metal, such as aluminum, is placed in contact with the adherent layer and heated to between 100° and 150° C. for between about 0.5 to 5.0 hr. The adherent layer serves as an adhesive, and the TEFLON and second polymer or metal do not separate under ordinary conditions of use.

In another aspect, polyvinyl fluoride polymer is covered with a thin layer about 5 to 25 mil (preferred 10–15 mil) of fluorinated ester substituted alkoxy cellulose. The adherent layer has a controlled hydrophilicity and a contact angle with water of between about 85° and 95°. The adherent layer is a good undercoating (or primer) for a passive polymer (e.g. a fluorinated thermoplastic, such as polyvinyl fluoride) surface to apply other materials, such as water-based latex paints or epoxy coatings to evenly coat and adhere well as a "weatherable" coating for a wide variety of articles. Additional materials which then adhere to the modified passive polymer are ink, varnish, dye and the like.

In another aspect, in the past, thermal distillation of liquids across a hydrophobic membrane has not been a practical approach for separating fresh water from salt water. This is due to a major problem called "water-logging". Salt water migrates into the pores of the hydrophobic membrane and causes the fresh water to make contact and mix. In other words, the micropores fill up with water, thereby destroying the vapor barrier needed for the micro evaporation/condensation process.

A composite membrane, may comprise a thin lyophobic microporous layer or membrane having a thin lyophilic layer on both sides of a lyophobic layer or only on the distilland side. Microevaporation and condensation occurs within the micropores of the lyophobic layer. If the liquid is water, the terms "hydrophobic" and "hydrophilic" will apply. A lyophilic layer on the distilland (i.e., liquid not vaporized) side prevents intrusion of distilland into the pores of the lyophobic layer ("water-logging"). The lyophilic layer on the distilland side of the porous membrane changes the surface curvature of the liquid/vapor interface in a manner which enhances the distillation rate through the porous membrane. These concepts, including the formation and the thickness of the lyophilic layers, etc., are discussed in detail by Cheng et al. (U.S. Pat. Nos. 4,419,187 and 4,316,772), which are incorporated herein by reference in their entirety.

In the present invention, a thin hydrophobic layer (between about 0.1 and 100 μM) of fluorinated ester substituted alkoxy cellulose on one, or preferably both sides of a porous hydrophobic membrane, such as TEFLON ®, TEDLAR ®, polyvinylidine fluoride or the like, is useful to improve the separation of fresh water from salt (or sea) water. (See Example 25 below.)

While not wanting to be bound by theory, it presently appears that these fluorinated ester substituted alkoxy cellulose polymers adhere to passive polymers because of attractive van der Waals forces. When the passive polymer contains fluorine (e.g., polytetrafluoroethylene), it appears that the fluorine-containing portions of the adherent layers are attracted to and absorbed by the fluorine portion of the passive polymer. This configuration allows the remainder of the modified alkoxy cellulose to be above the surface of the fluorinated passive polymer for further bonding to other materials. In the case of a non-fluorinated passive polymer, the modified cellulose adherent layer simply provides a more wettable surface for additional bonding to another material.

Preferred Embodiments

Preferred embodiments of the process to produce an adherent layer and the article produced thereby include: (1) those passive polymeric materials comprising carbon and fluorine, the halocarbons, particularly polytetrafluoroethylene, and (2) those passive polymeric materials comprising carbon and hydrogen, the poly(alkylenes), particularly polyethylene and polypropylene and the poly(haloalkylenes), particularly polyvinyl chloride. A preferred embodiment includes those processes and articles wherein between about 0.01 to 2.00 (especially 0.1 to 2.0) of the reactive hydroxyl groups are present as the fluoroesters of formula I or II, and the remaining between about 1.0 to 2.99 of the hydroxyl groups are substituted as alkoxy groups.

Other preferred embodiments include those wherein between about 2.20 and 2.60 of the reactive hydroxyl groups of each cellulose glucose unit are present as alkoxy groups, particularly methoxy or ethoxy, and the remainder (0.40 to 0.80) of the reactive hydroxyls are fluorinated esters of formula I and II.

More preferred embodiments are those wherein the fluoroester group is structure (I), hereinabove, particularly where n is between 2 and 7. Other more preferred embodiments are those where the fluoroester group is structure (II), hereinabove particularly where X is —CF$_3$, Y is —F, Z is —F, and m is 1 or where X is —CF$_3$, Y is —F, Z is —Cl, and m is 1.

A preferred embodiment of the process is where the solvent is a mixture of organic liquids, particularly a mixture of toluene, ethylene dichloride and vinyl acetate.

The following preparations, examples and illustrative embodiments of the invention are provided to enable those skilled in this art to more clearly understand and practice the present invention. They should not be considered as a limitation upon the scope of the invention, but merely as being illustrative and representative thereof.

PREPARATION A

Ether Acyl Fluorides (a) To a dried 500 ml stainless steel vessel is added 100 ml of diethyleneglycoldimethylether and 12 g of dry cesium fluoride. The vessel is cooled to about −80° C. using a DRY ICE/acetone bath and evacuated. There is then added 35.0 g of trifluoroacetylfluoride and 60 g of perfluoropropylene epoxide. The vessel is sealed and heated at 100° C. for 4 hr. After removal of the solvent, distillation of the liquid product produces perfluoro-2-ethoxypropionyl fluoride, CF$_3$CF$_2$O—CF(CF$_3$)C(=O)—F. (See U.S. Pat. No. 3,250,808). The structure is confirmed by infrared spectral and elemental analysis.

The undistilled or distilled product may contain telomers including

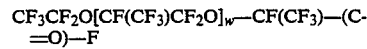

where w is 0 to 6. These mixtures of telomers are also useful in the present invention.

(b) Similarily, proceeding as is described in Subpart (a) above of this Preparation, but substituting a stoichiometrically equivalent amount of:

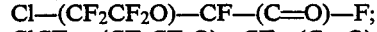
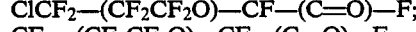
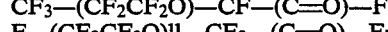
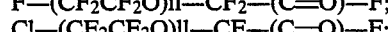
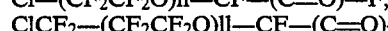
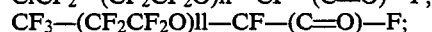
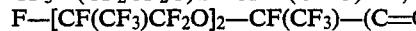
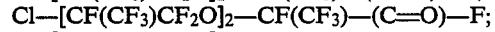
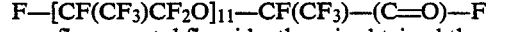
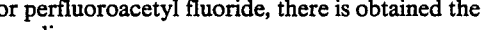

for perfluoroacetyl fluoride, there is obtained the corresponding:

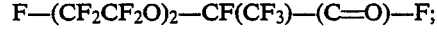

Cl—(CF$_2$CF$_2$O)$_2$—CF(CF$_3$)—(C=O)—F;
ClCF$_2$—(CF$_2$CF$_2$O)$_2$—CF(CF$_3$)—(C=O)—F;
CF$_3$—(CF$_2$CF$_2$O)$_2$—CF(CF$_3$)—(C=O)—F;
F—(CF$_2$CF$_2$O)$_{12}$—CF(CF$_3$)—(C=O)—F;
Cl—(CF$_2$CF$_2$O)$_{12}$—CF(CF$_3$)—(C=O)—F;
ClCF$_2$—(CF$_2$CF$_2$O)$_{12}$—CF(CF$_3$)—(C=O)—F;
CF$_3$—(CF$_2$CF$_2$O)$_{12}$—CF(CF$_3$)—(C=O)—F;
F—[CF(CF$_3$)CF$_2$O]$_3$—CF(CF$_3$)—(C=O)—F;
Cl—[CF(CF$_3$)CF$_2$O]$_3$—CF(CF$_3$)—(C=O)—F; or
F—[CF(CF$_3$)CF$_2$O]$_{12}$—CF(CF$_3$)—(C=O)—F.

(c) Similarly, proceeding as is described in Subpart (a) above of this Preparation but substituting a stoichiometrically equivalent amount of perfluoroethylene oxide for perfluoropropylene oxide, there is obtained the corresponding CF$_3$CF$_2$OCF$_2$—(C=O)—F. Care must be taken when handling the perfluoroethylene oxide because of its potentially explosive nature.

(d) Similarly, proceeding as is described in Subpart (a) above of this Preparation but substituting a stoichiometrically equivalent amount of ClCF$_2$CF$_2$(C=O)—F for perfluoroacetyl fluoride and a stoichiometrically equivalent amount of 3-chloroperfluoropropylene oxide for perfluoropropylene oxide, there is obtained the corresponding ClCF$_2$CF$_2$CF$_2$OCF(CF$_2$Cl)(C=O)—F in good yield.

PREPARATION B

Ethoxy Cellulose—O—(C=O)—CF$_2$—CF$_2$—CF$_3$ (a) At ambient temperature, 46 g of medium ETHOCEL (46.3% ethoxy, i.e. 2.23 ethoxy groups and 0.77 residual hydroxyl groups for each glucose unit) is dissolved in 500 ml of anhydrous methylene chloride. To this stirred solution is slowly added 36 g of anhydrous pyridine and 97 g of CF$_3$CF$_2$CF$_2$C(=O)—Cl. After 6 hr of continuous stirring, the solution is poured into ethanol:water (70:30) to precipitate the polymeric product. The solution is decanted and the polymer is redissolved in acetone, reprecipitated in methanol:water (70:30), dried in air and vacuum dried at 95° C. to produce ETHOCEL—O—(C=O)CF$_2$CF$_2$CF$_3$. Infrared spectral analysis shows only a trace of unreacted hydroxyl groups are present.

(b) Similarily, proceeding as is described in Subpart (a) above of this Preparation but substituting a stoichiometrically equivalent amount of:
CF$_3$—CF$_2$—(C=O)—F;
CF$_3$—CF$_2$—(C=O)—Cl;
CF$_3$—CF$_2$—(C=O)—Br;
CF$_3$—(CF$_2$)$_6$—(C=O)—F;
CF$_3$—(CF$_2$)$_6$—(C=O)—Cl;
CF$_3$—(CF$_2$)$_{12}$—(C=O)—F;
CF$_3$—(CF$_2$)$_{12}$—(C=O)—Cl; or
mixtures thereof, for CF$_3$CF$_2$CF$_2$(C=O)—Cl, there is obtained the corresponding:
ETHOCEL—O—(C=O)—CF$_2$CF$_3$;
ETHOCEL—O—(C=O)—CF$_2$CF$_3$;
ETHOCEL—O—(C=O)—CF$_2$CF$_3$;
ETHOCEL—O—(C=O)—(CF$_2$)$_6$—CF$_3$;
ETHOCEL—O—(C=O)—(CF$_2$)$_6$—CF$_3$;
ETHOCEL—O—(C=O)—(CF$_2$)$_{12}$—CF$_3$;
ETHOCEL—O—(C=O)—(CF$_2$)$_{12}$—CF$_3$ or
mixtures thereof. These ETHOCEL derivatives have essentially all of the 0.77 reactive hydroxyl groups per glucose unit present as the fluorinated ester.

(c) Similarly, proceeding as is described in Subpart (a) above of this Preparation but substituting
Standard ETHOCEL (49% ethoxy);
Medium METHOCEL;
Standard METHOCEL;
or mixtures thereof for medium ETHOCEL; there is obtained the corresponding
Standard ETHOCEL—O—(C=O)—CF$_2$CF$_2$CF$_3$;
Medium METHOCEL—O—(C=O)—CF$_2$CF$_2$CF$_3$;
Standard METHOCEL—O—(C=O)—CF$_2$CF$_2$CF$_3$; or mixtures thereof.

(d) Similarly, proceeding as is described in Subpart (a) above of this Preparation but substituting a stoichiometrically equivalent amount of ClCF$_2$CF$_2$CF$_2$OCF(CF$_2$Cl)(C=O)F for CF$_3$CF$_2$CF$_2$(C=O)Cl, there is obtained the corresponding: ETHOCEL—O—(C=O)—CF(CF$_2$Cl)—OCF$_2$CF$_2$CF$_2$Cl.

EXAMPLE 1

ADHERENT LAYER MODIFIED TEFLON (a) A cellulose polymer, 10 g, consisting of standard ETHOCEL ® (Dow Chemical Co., Midland, MI 48640) where each glucose unit contains roughly 2.58 ethoxy groups and 0.42 remaining reactive hydroxyl groups are esterified to alkanoyl side chains of the formula, —O(C=O)—CF(CF$_2$Cl)—O—CF$_2$CF$_2$CF$_2$Cl was dissolved in a 1/1/1 by volume mixture of ethyl acetate/ethylene dichloride/toluene solvent (100 ml) to produce a 10% by weight polymer solution. The resultant polymer solution was filtered through a 10μ filter to remove particulates and insoluble gel clumps. The polymer solution was then applied as a thin uniform coating to TEFLON using a casting bar or doctor blade. The solvent was removed by slow evaporation at ambient temperatures in a gentle air current, followed by gradual heating for two hr from 50° to 105° C. followed by 25° hr at 105° C. The resultant thin layer adhered very tenaciously to the TEFLON.

When India ink is applied, the ink adheres well to the layer.

(b) A cellulose polymer consisting of medium ETHOCEL, where each glucose unit contains roughly 2.23 ethoxy groups and 0.77 residual hydroxyl groups esterified to side chains of the formula: —O—(C=O)CF$_2$CF$_2$CF$_3$, was dissolved in ethyl acetate to produce a 12% by weight polymer solution. A cellulose prefilter was used to filter the resultant polymer solution which was then applied as a uniform layer to a TEDLAR (polyvinylfluoride) sheet. Slow solvent removal was carried out at ambient temperature in a laboratory hood for a few hours. The solvent-cellulose layer was subsequently dried by heating overnight in a vacuum oven at 54° C. The resultant thin layer coating the TEDLAR surface could not be peeled off or removed from the fluorinated polymer substrate.

(c) An 8 to 10% by weight polymer solution of the same polymer in Example 1, Subpart (b) above was made using 1,1,1—trichloroethane as solvent. A thin film layer was similarly applied to a TEFLON sheet, dried in a laboratory hood at ambient temperature for about four hours, and then heated at about 60° C. in a vacuum oven for about 17 hr. The resultant film adhered tenaciously to the TEFLON polymer surface.

(d) A 10% by weight polymer solution of Standard ETHOCEL as described in Example 1, Subpart (a) above was prepared in acetone solvent, except that the residual hydroxyl groups were esterified to side chains of the formula —O—(C=O)—C$_7$F$_{15}$ rather than —O—(C=O)—CF(CF$_2$Cl)—O—CF$_2$CF$_2$CF$_2$Cl. A thin film was cast separately on both TEFLON and TEDLAR surfaces and vacuum dried at 56° C. for 24 hr. The resultant films could not be easily removed from either the TEFLON or TEDLAR surfaces.

(e) Similarly, proceeding as in Subpart (a) above of this Example, but substituting a volumetric equivalent of:

hexane;
acetone;
ethyl acetate;
1,1,1-trichloroethane;
ethylene dichloride;
toluene;
methanol;
ethanol;
diethyl ether;
dioxane;

acetonitrile or mixtures thereof, for the solvent, ethyl acetate/ethylene dichloride/toluene, there is obtained the corresponding adherent layer.

(f) Similarly, proceeding as in Subpart (a) above of this Example, but substituting a stoichiometrically equivalent amount of medium ETHOCEL;
standard METHOCEL;
medium METHOCEL; and mixtures thereof, there is obtained the corresponding adherent layer.

(g) Similarly proceeding as described in Subpart (a) above of this Example, but substituting the ethoxy cellulose modified with alkanoyl side chains of the general formula:

—O(C=O)—CF$_2$—CF$_2$—H;
—O(C=O)—(CF$_2$)$_{11}$CF$_2$—H;
—O(C=O)—(CF$_2$)$_2$—CF$_3$;
—O(C=O)—(CF$_2$)$_6$—CF$_3$;
—O(C=O)—(CF$_2$)$_{12}$—CF$_3$;
—O(C=O)—CF$_2$—O—CF$_2$—CF$_2$—CF$_2$Cl;
—O(C=O)—CF(CF$_3$)—O—(OCF$_2$CF$_2$)$_2$—CF$_3$;
and mixtures thereof, there is obtained the corresponding adherent layer.

(h) Similarly, proceeding as is described in Subpart (a) above of this Example, but substituting polypropylene fluoride;
polyvinylidine fluoride;
polytrifluorochloroethylene;
polyvinyl fluoride;
polyvinyl chloride;
polyethylene (high or low density);
polypropylene (high or low density); or copolymers or blends of any of these passive polymers for TEFLON, there is obtained the corresponding passive polymer, copolymer or blend having an adherent fluorinated ester substituted alkoxy cellulose layer.

EXAMPLES 2-22

FLUORINATED-ETHER-ESTER SUBSTITUTED ALKOXY ADHERENT CELLULOSE LAYER MODIFIED TEFLON

Examples 2 to 22 are performed in the manner described above in Subpart (a) of Example 1. Specific fluorinated alkanoyl substituted alkoxy cellulose (ETHOCEL) are used at the aforementioned conditions. The specific fluorinated-ester alkoxy adherent cellulose modified TEFLON is found in Table 1.

TABLE 1

FLUORO-ETHER-ESTER MODIFIED CELLULOSE COATING

[ALKOXY CELLULOSE]—O—(C=O)—CF—(OCF$_2$—CF)$_{\overline{m}}$Z
$\phantom{xxxxxxxxxxxxxxxxxxxxxxxxxxx}$|$\phantom{xxxxxx}$|
$\phantom{xxxxxxxxxxxxxxxxxxxxxxxxxxx}$X$\phantom{xxxxx}$Y

| Ex. | —X | —Y | —Z | m | Cellulose[a] (Reactive—OH) |
|---|---|---|---|---|---|
| 2. | F | F | F | 1 | ETHOCEL (0.42) |
| 3. | F | CF$_3$ | F | 3 | ETHOCEL (0.77) |
| 4. | F | CF$_3$ | CF$_3$ | 5 | ETHOCEL (0.42) |
| 5. | F | F | F | 12 | ETHOCEL (0.42) |
| 6. | CF$_3$ | F | F | 1 | METHOCEL (0.77) |
| 7. | CF$_3$ | F | F | 12 | ETHOCEL (0.42) |
| 8. | CF$_3$ | CF$_3$ | F | 1 | METHOCEL (0.77) |
| 9. | CF$_3$ | CF$_3$ | F | 12 | ETHOCEL (0.77) |
| 10. | CF$_3$ | CF$_3$ | CF$_3$ | 1 | METHOCEL (0.77) |
| 11. | F | Cl | F | 1 | ETHOCEL (0.42) |
| 12. | F | Cl | F | 12 | ETHOCEL (0.77) |
| 13. | CF$_3$ | Cl | F | 1 | ETHOCEL (0.42) |
| 14. | CF$_3$ | Cl | F | 12 | ETHOCEL (0.77) |
| 15. | F | Cl | CF$_2$Cl | 1 | ETHOCEL (0.42) |
| 16. | F | Cl | CF$_2$Cl | 12 | ETHOCEL (0.77) |
| 17. | F | F | CF$_2$Cl | 1 | ETHOCEL (0.42) |
| 18. | F | F | CF$_2$Cl | 12 | ETHOCEL (0.77) |
| 19. | F | CF$_3$ | CF$_2$Cl | 1 | ETHOCEL (0.42) |
| 20. | F | CF$_3$ | CF$_2$Cl | 12 | ETHOCEL (0.77) |
| 21. | CF$_2$Cl | CF$_2$Cl | CF$_2$Cl | 1 | ETHOCEL (0.42) |
| 22. | CF$_2$Cl | CF$_2$Cl | CF$_2$Cl | 12 | ETHOCEL (0.77) |

[a]Cellulose from the Dow Chemical Co., Midland, MI.

EXAMPLE 23

ADHESION OF POLYMERIC MATERIALS TO ADHERENT LAYER MODIFIED TEFLON (a) The procedure described in Example 1, Subpart (a) above is modified such that TEFLON is first modified with a layer of solution of fluorinated ester substituted alkoxy cellulose and covered with a sheet of polyethylene. The solvent is then removed at 100° C. in a vacuum overnight with the films pressed together using a 100 g weight. The TEFLON-polyethylene sheets do not separate under normal use.

(b) The procedure of Subpart (a) above of this Example is followed except that the polyethylene sheet is replaced by a flexible sheet of TEFLON. After removal of the solvent as described, the two TEFLON flexible sheets are sealed and do not separate under normal use.

(c) The procedure of Subpart (b) is followed except that the TEFLON is in the form of two rigid sheets each about 4"×4"×⅛". When the solution of the modified cellulose is placed on one sheet, the other is placed on top, and the solvent is removed over 16 hr at 100° C. in a vacuum. The two TEFLON sheets adhere to each other and do not separate under normal use.

EXAMPLE 24

HYDROPHILIC SURFACE LAYER OF A HYDROPHOBIC MEMBRANE (a) In the manner described in Example 1, Subpart (a) above, a medium ETHOCEL (46.3% ethoxyl), having 2.23 ethoxyl groups and 0.77 residual hydroxyl groups modified with —O(C=O)CF$_2$CF$_2$CF$_3$ groups was dissolved in ethyl acetate as a 10–12% solution and coated on a membrane of TEDLAR using a casting bar. After drying for 3 hr in a laboratory hood, the layered polymer was dried in a vacuum oven at 54° C. over a weekend. A thin adherent coating was obtained which could not be easily removed. The usual contact angle of water on TEDLAR is about 65° to 67°. This adherent film modified TEDLAR had a contact angle of between about 87° to 90°.

(b) In the manner described in Example 1, Subpart (a) above, a standard-ETHOCEL (49.4% ethoxyl) where each glucose unit contains about 2.58 ethoxy groups and 0.42 residual hydroxyl groups modified by $-O(C=O)-C_7F_{15}$ was dissolved in acetone as a 10% by weight polymer solution. The polymer solution was applied as a thin uniform film layer to a TEFLON surface using a doctor blade. Slow solvent evaporation while loosely covering with a tray in a laboratory hood for about 1 hr was followed by vacuum drying at 56° C. for 24 hr. The thin uniform polymer layer on the TEFLON had a water contact angle of about 90° C.

(c) A sample of a TEFLON ® coated with the fluorinated ester substituted alkoxy cellulose described in Example 1, Subpart (a) above is subjected to a contact angle measurement. The contact angle of water with the coating is about 90°. The contact angle of water with TEFLON ® is usually between 104° to 112°.

(d) A number of adherent layer modified TEDLAR and TEFLON samples of Subparts (a), (b) and (c) above of this Example are each treated with a standard latex paint, an epoxy varnish, a dye and a printing ink. The adherent coating acts as an undercoating, and these additional materials adhere well to the layer of modifying cellulose on the passive polymer. The treatment of the unlayered TEDLAR and TEFLON with the same latex paint, varnish, dye, or ink is not satisfactory, because it is removed with pressure.

EXAMPLE 25

HYDROPHILIC SURFACE LAYER ON A POROUS HYDROPHOBIC MEMBRANE (a) A thin skin microporous hydrophobic membrane is prepared using polyvinylidene fluoride. The membrane has asymmetrically shaped pores of maximum diameter of 0.3 μm. The membrane has a thickness of 5 mil. This membrane is coated one side at a time with a thin layer of the modified cellulose polymer of Example 1, Subpart (a) using a doctor blade. After evaporation of the solvent at 100° C. in a vacuum for 16 hr, each hydrophilic layer is 1.0μ thick. A distillation temperature of about 120° F. is used without pressure. The addition of the hydrophilic layers to the hydrophobic membrane increases the fresh water production compared to the uncoated membrane.

EXAMPLE 26

CONTAINER FOR STORAGE AND FOR APPLICATION OF FLUORINATED ESTER SUBSTITUTED ALKOXY CELLULOSE IN A SOLVENT (a) A solution of standard ETHOCEL$-O-(C=O)-CF(CF_2Cl)-O-CF_2CF_2CF_2Cl$ (50 g) in a 1:1:1 solution of toluene:ethylene dichloride:ethyl acetate, 500 ml, are combined. After the modified cellulose dissolves, the solution is filtered through a 10μ filter to remove any particulate. The solution is placed in a metal container having an aerosol nozzle and pressurized using dichlorodifluoromethane. The solution is stable over a six-month period, and the solution can be applied to a passive surface directly from the container. Multiple applications, with removal of the solvent are necessary to obtain a layer having a 10 mil thickness.

(b) The solution of Subpart (a) of this Example is placed in a nonpressurized container having a manual pump. The solution has a shelf-life of 6 months, and is manually applied directly from the container.

While only a few embodiments of the invention have been shown and described herein, it will become apparent to those skilled in the art that various modifications and changes can be made in the process and article without departing from the spirit and scope of the present invention. All such modifications and changes coming within the scope of the appended claims are intended to be carried out thereby.

What is claimed is:

1. A device for containing and delivering a composition useful for producing a modifying layer on a passive polymeric material, said device comprising an enclosed container having integral fluid delivery means containing a composition comprising:

(A) a fluorinated ester substituted alkoxy cellulose having, on the average, between about 1.0 to 2.99 of the three reactive hydroxyl groups of each glucose unit present as alkoxy groups, and the remainder of between about 0.01 to 2.00 of the reactive hydroxyl groups of each glucose unit present as a fluoroester group of the formula:

(i) 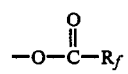 (I)

wherein:

$R_f$ is branched perfluoroalkyl comprising 3 to 20 carbon atoms; or $-(CF_2)_nCF_2-Q$, wherein Q is hydrogen or fluorine; n is an integer from 1 to 19; or (ii) 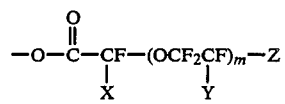 (II)

wherein:

X is selected from the group consisting of $-F$, $-CF_3$ and $-CF_2Cl$, Y is $-F$, $-Cl$, $-CF_2Cl$ or perfluoroalkyl having from 1 to 10 carbon atoms, Z is $-F$, $-Cl$, $-CF_3$ or $CF_2Cl$, and m is an integer from 1 to 12; and (B) an organic solvent, said composition being deliverable through said fluid delivery means.

2. The device of claim 1 wherein the fluid delivery means is a gas-pressurized container or a container having a manual pump.

3. The device of claim 1 wherein said fluoroester group is:

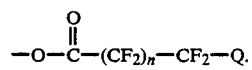 (I)

wherein n is between 2 and 7 and Q is $-F$.

4. The device of claim 1 wherein said fluoroester group is:

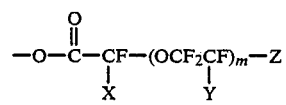

5. The device of claim 4 wherein X is $CF_3$ or $CF_2Cl$, Y is F and Z is selected from $-F$ or $-Cl$.

6. A composition useful for producing a modifying adherent layer on a passive polymeric material by aerosol spraying of the liquid composition, comprising:

(a) a fluorinated ester substituted alkoxy cellulose having, on the average, between about 1.0 to 2.99 of the three reactive hydroxyl groups of each glucose unit present as alkoxy groups, and the remainder of between about 0.1 to 2.00 of the reactive hydroxyl groups of each glucose unit present as a fluorester group of the formula:

(i)
$$-O-\overset{O}{\overset{\|}{C}}-R_f \qquad (I)$$

wherein:

$R_f$ is branched perfluoroalkyl comprising 3 to 20 carbon atoms; or $-(CF)_nCF_2-Q$;

wherein:

Q is hydrogen or fluorine, and n is an integer from 1 to 19; or (ii)
$$-O-\overset{O}{\overset{\|}{C}}-\underset{X}{\underset{|}{CF}}-(OCF_2\underset{Y}{\underset{|}{CF}})_m-Z \qquad (II)$$

wherein:

X is selected from the group consisting of —F, $-CF_3$ and $-CF_2Cl$, Y is —F, —Cl, $-CF_2Cl$ and or perfluoroalkyl having from 1 to 10 carbon atoms, Z is independently selected from the group consisting of —F, —Cl, $-CF_3$ and $-CF_2Cl$, and m is an integer from 1 to 12 wherein the size of the cellulose is 10 microns or smaller; and (b) an organic liquid having a boiling point at atmospheric pressure between about ambient and of less than 205° C.

7. The liquid composition of claim 6 wherein between about 2.20 and 2.60 of said three reactive hydroxyl groups of the cellulose are alkoxy groups.

8. The liquid composition of claim 7 wherein said alkoxy groups are methoxy or ethoxy.

9. The liquid composition of claim 8 wherein said fluoroester group is:

$$-O-\overset{O}{\overset{\|}{C}}-(CF_2)_n-CF_2-Q. \qquad (I)$$

10. The liquid composition of claim 9 wherein n is between 2 and 7.

11. The liquid composition of claim 8 wherein said fluorester group is:

$$-O-\overset{O}{\overset{\|}{C}}-\underset{X}{\underset{|}{CF}}-(OCF_2\underset{Y}{\underset{|}{CF}})_m-Z \qquad (II)$$

12. The liquid composition of claim 11 wherein X is $-CF_3$, Y is —F, Z is —F, and m is 1.

13. The liquid composition of claim 11 wherein X is $-CF_3$, is —F, Z is —Cl, and m is 1.

14. The liquid composition of claim 6 wherein the organic solvent is selected from liquids boiling between about 30° and 200° C.

15. The liquid composition of claim 14 wherein the organic solvent is selected from the group consisting of linear hydrocarbons, branched hydrocarbons, cyclic hydrocarbons aromatic hydrocarbons, halocarbons, halohydrocarbons, esters, ketones, ethers, alcohols, nitriles and mixtures thereof.

16. The liquid composition of claim 15 wherein said organic solvent is a mixture of organic liquids.

17. The liquid composition of claim 16 wherein said mixture comprises toluene, ethylene dichloride and ethyl acetate.

18. The liquid composition of claim 16 wherein said mixture comprises ethyl acetate and ethylene dichloride.

19. The liquid composition of claim 15 wherein said organic solvent consists essentially of a single organic liquid.

20. The liquid composition of claim 19 wherein the single organic liquid is selected from the group consisting of acetone, methyl ethyl ketone, ethyl acetate, methylene chloride, chloroform, 1,1,1-trichloroethane, toluene, ethanol, benzyl alcohol, and dimethylformamide.

21. The liquid composition of claim 20 wherein the single organic liquid is ethyl acetate.

* * * * *

UNITED STATES PATENT AND TRADEMARK OFFICE
CERTIFICATE OF CORRECTION

PATENT NO. : 4,749,414

DATED : June 7, 1988

INVENTOR(S) : Marinda L. Wu; John F. Voeks

It is certified that error appears in the above-identified patent and that said Letters Patent is hereby corrected as shown below:

On the cover sheet in the ABSTRACT, the paragraph after formula 1, line 3, delete "of" and insert -- or --;

UNITED STATES PATENT AND TRADEMARK OFFICE
CERTIFICATE OF CORRECTION

PATENT NO. : 4,749,414

DATED : June 7, 1988

INVENTOR(S) : Marinda L. Wu; John F. Voeks

It is certified that error appears in the above-identified patent and that said Letters Patent is hereby corrected as shown below:

Col. 6, line 21, after "as" insert -- methyl cellulose and ethyl cellulose, preferably having from between about 1.0 to 2.99 available free hydroxyl groups, more preferably from between about 2 and 2.99 free hydroxyl groups. These materials, having free hydroxyl groups on the backbone of the polymer, are available from a variety of commercial sources, primarily from the Dow Chemical Company, Midland, Michigan 48640, as standard and medium METHOCEL ® and ETHOCEL ®. A preferred substituted cellulose has between about 2.20 and 2.60 of the reactive hydroxyl groups present as alkoxy groups. The recited number of hydroxyl groups substituted by alkyl and/or fluoride-containing groups are average values.

Standard ETHOCEL (49.7% ethoxy substituted) has each glucose unit of the cellulose containing about 2.58 ethoxy groups and about 0.42 of the residual groups are reactive hydroxyl groups. Medium ETHOCEL (46.3% ethoxy) has each glucose unit containing roughly 2.23 ethoxy groups and about 0.77 of the residual groups are reactive hydroxyl groups. METHOCEL is also available as the hydroxypropyl-METHOCEL and hydroxybutyl-METHOCEL. This invention contemplates the use of these hydroxyalkoxy cellulose materials. Therefore, the term "alkoxy" includes hydroxypropoxy, hydroxybutoxy and the like.

Fluorinated Acyl Halides

The linear and branched fluorinated acyl halides which react with the reactive hydroxyls of the alkoxy cellulose are either commercially available or may be prepared by adaptation of procedures described in the literature. [See W. A. Sheppard and C. M. Sharts, *Organic Fluorine Chemistry*, W. A. Benjamin &

--;

UNITED STATES PATENT AND TRADEMARK OFFICE
CERTIFICATE OF CORRECTION

PATENT NO. : 4,749,414

DATED : June 7, 1988

INVENTOR(S) : Marinda L. Wu; John F. Voeks

It is certified that error appears in the above-identified patent and that said Letters Patent is hereby corrected as shown below:

Col. 6, line 52, after "fluoride:" delete "methyl cellulose and";

Col. 6, delete lines 53-68;

Col. 7, delete lines 1-17;

Col. 10, line 52, "Similarly" has been misspelled;

Col. 11, line 44, "Similarly" has been misspelled;

Col. 12, line 29, after "10μ" add a space;

Col. 12, line 36, after "25" delete "°";

Col. 14, line 42, after "Exa" add a hyphen;

Col. 16, line 49, after "is" insert -- selected from --;

Col. 17, line 10, "fluoroester" has been misspelled;

Col. 17, line 31, after the second reference to "-$CF_2Cl$" delete "and";

Col. 17, line 38, after "pressure" delete "between about ambient and";

Col. 18, line 9, "fluoroester" has been misspelled;

UNITED STATES PATENT AND TRADEMARK OFFICE
CERTIFICATE OF CORRECTION

PATENT NO. : 4,749,414
DATED : June 7, 1988
INVENTOR(S) : Marinda L. Wu; John F. Voeks It is certified that error appears in the above-identified patent and that said Letters Patent is hereby corrected as shown below:

Col. 18, line 19, after "-CF$_3$," add -- Y --;

Col. 18, line 26, after "hydrocarbons" add a comma.

Signed and Sealed this

Twenty-ninth Day of August, 1989

*Attest:*

DONALD J. QUIGG

*Attesting Officer*      *Commissioner of Patents and Trademarks*